United States Patent [19]

Hoenselaar et al.

[11] Patent Number: 5,020,637
[45] Date of Patent: Jun. 4, 1991

[54] BICYCLE CHAIN LUBRICATING AND CLEANING APPARATUS AND METHOD

[75] Inventors: John F. Hoenselaar, Anacortes; Eivind Clausen, Bellingham, both of Wash.

[73] Assignee: Allsop, Inc., Wash.

[21] Appl. No.: 532,249

[22] Filed: Jun. 1, 1990

Related U.S. Application Data

[63] Continuation of Ser. No. 359,087, May 26, 1989, abandoned, which is a continuation-in-part of Ser. No. 243,422, Sep. 12, 1988, abandoned, which is a continuation-in-part of Ser. No. 142,066, Jan. 11, 1988, abandoned, which is a continuation-in-part of Ser. No. 54,444, May 27, 1987, abandoned, which is a continuation-in-part of Ser. No. 884,285, Jul. 10, 1986, abandoned, which is a continuation-in-part of Ser. No. 708,680, Mar. 6, 1985, abandoned.

[51] Int. Cl.$^5$ ............................................. F16N 21/00
[52] U.S. Cl. ..................................... 184/15.1; 184/16; 401/10; 401/190
[58] Field of Search .................... 184/15.1, 15.2, 15.3, 184/16; 222/402.13, 402.14, 402.15; 401/190, 9–11; 285/312, 320; 15/94, 97 R, 104 R; 118/307, 404, 405; 427/434.1

[56] References Cited

U.S. PATENT DOCUMENTS

| | | | |
|---|---|---|---|
| 531,176 | 12/1894 | Furbush, Jr. | 184/16 |
| 1,519,095 | 12/1924 | Kraft | 285/312 X |
| 2,624,899 | 1/1953 | Smith | 401/13 X |
| 3,112,849 | 12/1963 | Wallace | 222/402.15 X |
| 3,823,797 | 7/1974 | Ducatillon | 184/16 |
| 3,989,388 | 11/1976 | Sparr, Sr. | 401/11 |
| 4,120,380 | 10/1978 | Mann | 184/28 X |
| 4,333,589 | 6/1982 | Bush | 222/402.13 X |
| 4,783,186 | 11/1988 | Manning et al. | 401/190 |

FOREIGN PATENT DOCUMENTS 3332175  3/1985  Fed. Rep. of Germany ..... 184/15.1

*Primary Examiner*—Leonard E. Smith
*Attorney, Agent, or Firm*—Hughes & Multer

[57] ABSTRACT

A lubricating and cleaning device adapted to be mounted to a pressurized can of lubricating oil and used to lubricate and clean a drive chain of a bicycle or motorcycle. The device has a generally cylindrical housing with an open slot to receive the chain. A plurality of brushes are positioned within the housing to engage the chain. A tube extends from the pressurized container to the housing to transmit the lubricating oil to one of the brushes so that the chain can be lubricated.

21 Claims, 4 Drawing Sheets

BICYCLE CHAIN LUBRICATING AND CLEANING APPARATUS AND METHOD

This is a continuation of copending application Ser. No. 07/359,087 filed on May 26, 1989 abandoned, which is a continuation of application Ser. No. 07/243,422, filed Sept. 12, 1988 abandoned; which is a continuation of 07/142,066, filed Jan. 11, 1988 abandoned; which is a continuation of 07/054,444, filed May 27, 1987 abandoned; which is a continuation of 06/884,285, filed July 10, 1986 abandoned; which is a continuation of 06/708,680, filed Mar. 6, 1985 abandoned.

BACKGROUND OF THE INVENTION

1. Field of the Invention

The present invention relates to an apparatus and method for lubricating and cleaning a drive chain or the like, such as a drive chain for a bicycle or motor cycle.

2. Background Art

Part of the regular maintenance of a bicycle or motorcycle is to periodically apply a lubricant to the drive chain. A common way of accomplishing this is to place a lubricant container with its discharge opening above the chain, and then to move the chain along its normal path of travel, as the lubricant is dispensed from the container directly onto the chain. One of the problems with this standard practice is that it is difficult to apply the lubricant uniformly to all parts of the chain. Another drawback is that a portion of the lubricant tends to pass through the chain and drop on the floor below.

A search of the patent literature has disclosed a number of patents relating to lubricating devices of various sorts, and these are discussed below.

U.S. Pat. No. 4,120,380, Mann, shows a lubricating system where there is an oil container mounted to a motorcycle at the location of the drive chain. There is an operating lever mounted t the handle bar of the motorcycle, and this lever is in turn attached to a cable that operates a second lever that depresses the discharge head of the container for the lubricant. The discharge head is in turn connected to a tube which has its outlet opening directed to the drive chain. By operating the lever on the handlebar, the lubricant can be discharged onto the drive chain.

U.S. Pat. No. 3,934,677, Schott, shows a chain lubricating device where there is a permanent magnet which holds the lubricant applicating device against the chain. The lubricant is dispensed through a tube from a pressurized container to the applicating device.

U.S. Pat. No. 3,934,677, Schott, shows a chain lubricating applying grease to a cable. Various configurations are shown, and in general, these comprise a ring member which fits at least partially around the cable. The lubricant is dispensed from openings positioned at regularly spaced intervals around the ring. In one embodiment, there are bristles mounted from the ring that extend downwardly to engage the cable.

U.S. Pat. No. 3,823,797, Ducatallion, discloses a device for the oil is discharged from a can through a pad, from which the oil is applied to a drive chain.

U.S. Pat. No. 2,951,557, Jung, shows an oil applicator where that is mounted to a bicycle to lubricate the bicycle chain. There are upper and lower pads to engage the upper and lower surfaces of the chain, and a cup to feed oil onto the upper pad.

U.S. Pat. No. 603,654, Norris, shows a device somewhat similar to the Amberg device noted above. The Norris patent shows some brush-like members which engage the chain. It is stated that these are used for cleaning and also for lubricating the drive chain. Somewhat similar devices are shown in U.S. Pat. No. 556,786, Thompson, and also in U.S. Pat. No. 531,176, Furbush.

U.S. Pat. No. 501,626, Percy, shows a device mounted to the case of a drive chain where oil contained in a cup can be discharged into the case and onto the chain.

In spite of the fact that for a number of decades there have been various concepts, such as those noted above, for devices to lubricate drive chains for bicycles and motorcycles, to the best knowledge of the applicant, none of these have been widely accepted, and the usual method of applying the lubricant is a direct manual operation of discharging the lubricant from the container directly onto the chain.

Accordingly, it is an obJect of the present invention to provide a convenient lubricant dispensing device particularly adapted to lubricate and clean the drive chain of a bicycle or motorcycle, which device can be used conveniently and effectively for uniform application of the lubricant, while alleviating the problem of the lubricant dripping onto the floor or other objects. It is a further object to provide such a device which can be used quite effectively and conveniently with conventional lubricant dispensing containers that are presently on the market, such as a pressurized lubricant dispenser.

SUMMARY OF THE INVENTION

The apparatus of the present invention comprises an apparatus adapted to be used in conjunction with a lubricant dispensing container for applying the lubricant to a drive chain, such as a drive chain for a bicycle or motorcycle, and also the combination of such apparatus with the lubricant dispensing container.

The apparatus comprises a peripheral housing defining an open lubricating area to receive the drive chain, with the housing extending around at least a substantial portion of the lubricating area and having an access opening to receive the drive chain. There is brush means mounted within the housing and extending from the housing radially inwardly to engage the chain to clean as well as to lubricate.

A mounting member is connected to the housing and has an attaching portion adapted to be connected to the container so as to mount the apparatus to the container. There is a discharge tube means having an inlet end adapted to be connected to a lubricant dispensing discharge opening of the dispensing member, and an outlet end positioned to discharge lubricant into the lubricating area of the housing.

The outlet end of the discharge tube extends through the housing to discharge lubricant into the lubricating area. In the preferred form, the outlet end of the discharge tube is positioned within bristles of the brush means, whereby the lubricant is discharged into the bristles to then be applied to the drive chain which is being lubricated.

In a preferred embodiment, the brush means has brush portions positioned in the housing at angularly spaced locations encompassing a peripheral area greater than 180° around the lubricating area. The brush means comprises in this embodiment at least three brush members spaced angularly from one another, with the three brush members being spaced from one another at an angular distance of about one-third of a circle.

Desirably, the peripheral housing has a lengthwise dimension generally parallel to a lengthwise axis of the drive chain when the drive chain is positioned in and aligned with the lubricating area of the housing. The lengthwise dimension of the housing is sufficient, relative to the lengthwise dimension of the brush means, so that the brush means remains substantially enclosed by the housing so as to tend to prevent dripping of lubricant from the brush means.

The apparatus is particularly adapted to be used in conjunction with a lubricant dispensing container that has a dispensing head at one end of the container, with the dispensing head having a discharge opening positioned to discharge lubricant from the head in a predetermined direction. The discharge tube means is adapted to be connected to the discharge opening of the dispensing head.

Desirably, the mounting member and the housing are arranged so that with the apparatus mounted to the container, the lubricating area defined by the housing is positioned generally in alignment with the predetermined direction in which the lubricant is discharged from the container if the device were not mounted to the container.

In the preferred form, the container to which the apparatus is adapted to be connected is a pressurized container, having a body portion to be grasped by a person's hand, and also having a lengthwise axis. The dispensing head is mounted at one end of the container relative to the lengthwise axis, and the dispensing head is movable to cause discharge of the lubricant from the container. The apparatus is positioned so that the housing defining the lubricating area is positioned generally laterally of the dispensing head.

In the preferred form, the container has a closure member at an end thereof adjacent the dispensing head, and the mounting member comprises loop means engaging the closure member in clamping relationship. There is a clamping member movable toward and away from the loop means so as to be able to releasably clamp the loop means to the closure member of the container.

There is cam means mounted to the mounting member and operable to be moved in camming engagement with the clamping member so as to move the clamping member into its clamping position and to a release position.

In the preferred form, the mounting member is a generally planar member extending rearwardly from the housing, with the loop means being positioned at a rear end of the mounting member. The clamping member is positioned diametrically opposite to and forwardly of the loop means.

Other features of the present invention will become apparent from the following detailed description.

DESCRIPTION OF THE PREFERRED EMBODIMENT

Figure 1:
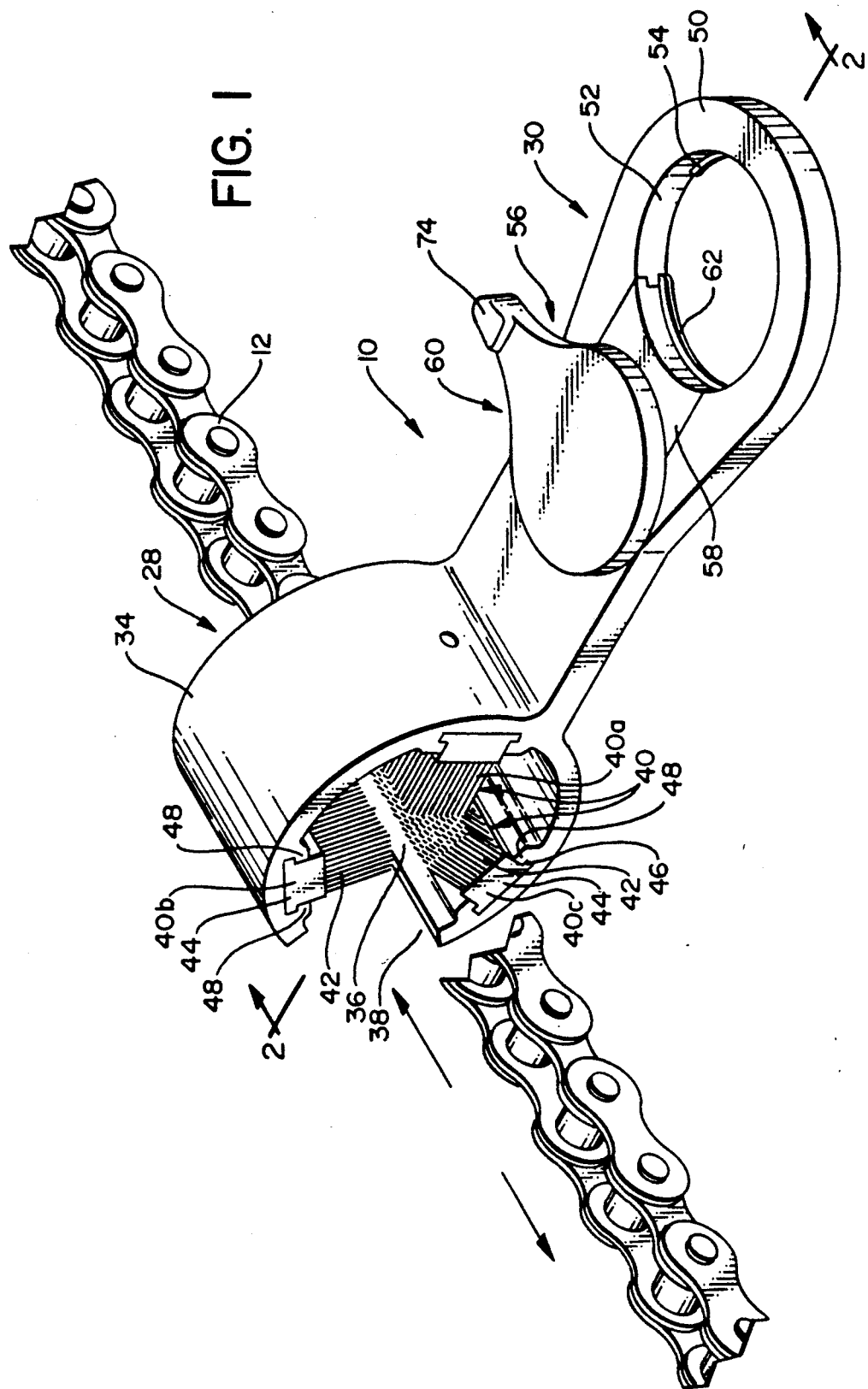
FIG. 1 is an isometric view of the apparatus of the present invention, shown in its operating position to apply oil to a bicycle chain, but not showing the standard lubricant container with which the device is designed to be used.

With reference to FIG. 1, the lubricating device 10 of the present invention is shown in its operating position relative to a standard bicycle or motorcycle drive chain 12 which is to be lubricated by the device 10. The device 10 is designed to be used conveniently and effectively in conjunction with a standard pressurized oil container, such as shown at 14 in FIGS. 2 and 3. (For convenience of illustration, the container 14 is not shown in FIG. 1.) This standard container 14 will be described briefly, after which the present invention will be described in more detail.

This container 14 has a main cylindrical body portion 16, which contains the lubricant and a top cover 18. Mounted to the cover 18 is a dispensing head 20 which can be depressed to discharge the lubricant through an opening 22 in the head 20. The head 20 is directly mounted to a closure member 24 that forms a portion of the cover 18 in a manner to form a circumferential groove 26 just below the closure member 24.

As indicated previously, the common method of utilizing such a standard container 14 to lubricate a drive chain is to discharge the lubricant directly from the dispensing head 20 onto the chain. In some instances, the lubricant is dispensed from the container 14 as an aerosol spray, but it can also be dispensed as a non-aerated liquid.

The device 10 of the present invention comprises a lubricating portion 28, a mounting portion 30 by which the device 10 is mounted to the container 14, and a dispensing tube 32 that carries the lubricant from the dispensing head 20 to the lubricating portion 28 of the device 10. In describing the device 10, the lubricating portion 28 shall be considered as being at the forward end, and the mounting portion 30 at the rear end of the device 10. Further, the device 10 will be considered as having a lengthwise axis extending from the rear to the front of the device, a transverse axis and a vertical axis which is parallel to the lengthwise axis of the container 14 when the device 10 is in its operating position on the container 14.

The lubricating portion 28 comprises a circumferential housing 34 having a generally cylindrical configuration and defining within the cylindrical configuration an open lubricating area 36. The housing 34 has a forward access slot or opening 38 which has a width dimension moderately greater than that of the drive chain 12 which is to be lubricated.

Mounted within the housing 34 are a plurality of brushes 40, having bristles 42 which extend radially inwardly to the lubricating area 36. As shown herein, there are three such brushes 40, and each has a base member 44 to which the bristles 42 are mounted. Each base member 44 is removably mounted in the housing 34 by means of a tongue-and-groove fitting 46. Each of the brushes 40 is inserted into the housing 34 are removed therefrom by sliding the base member 44 into the two transversely extending grooves defined by a related pair of lips 48 formed on the interior surface of the housing 34.

The mounting portion 30 of the device 10 has a general horizontally planar configuration, and connects to the rear portion of the housing 34 just below a midheight level thereof At the rear end of the connecting portion 30, there is a circular loop member 50 defining a circular opening 52 that has a diameter just slightly larger than that of the closure member 24. The rear end of the loop member 50 has a forwardly protruding semicircular lip 54 that extends radially inwardly relative to the loop 50 and is arranged to engage the groove 26 of the closure member 24 of the container 14.

The mounting portion 30 is provided with a releasable clamping mechanism 56 that comprises a clamping member 58 and a rotatable clamping cam member 60. The clamping member 58 is slide mounted in the mounting portion 30 at a location just forwardly of the loop opening 52, and is arranged for moderate slide motion along the lengthwise axis of the device 10. The rear end of the clamping member 58 has a circular configuration to match that of the closure member 24 and an arcuate inwardly extending lip 62 that is arranged to engage the groove 26 of the closure member 24 at a location diametrically opposed to that location where the lip 54 engages the groove 26.

The cam member 60 is mounted to a hub member 64 that is fixedly connected to the lower side of the mounting portion 30. The portion of the cam member that surrounds the hub member 64 is formed with an eccentric cam surface 66 that bears against a forward edge 66 of the clamping member 68. Also, the clamping member 58 has an upstanding finger 70 that fits in a related cam groove 72 formed in the clamping member 58. The cam member 60 also has an outwardly extending handle 74 so that the cam member 60 can conveniently be rotated into and from its clamping position.

Figure 2:
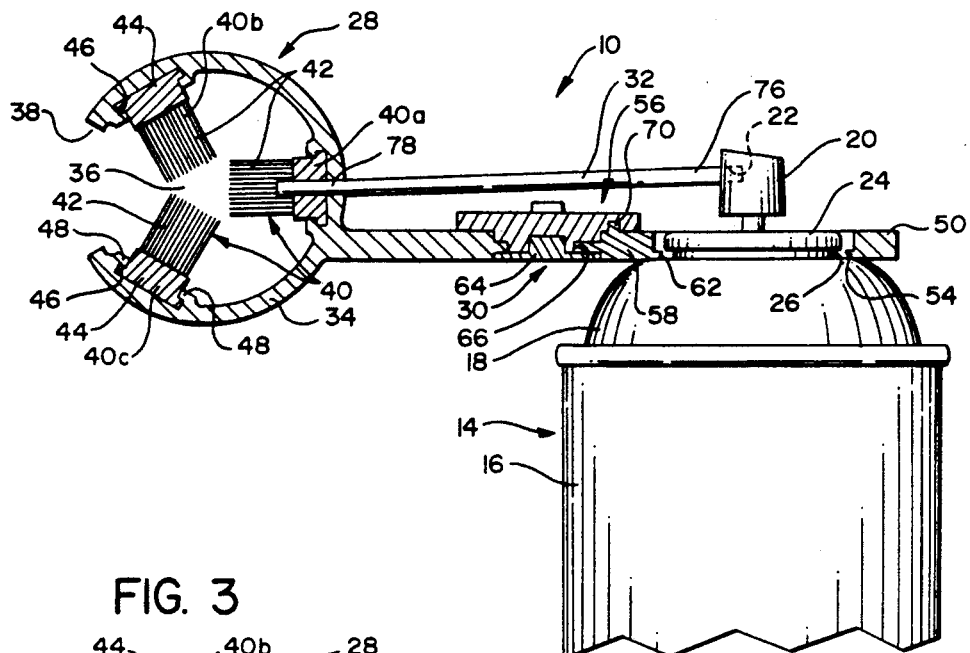
FIG. 2 is a sectional view taken along line 2—2 of FIG. 1, showing the apparatus of the present invention in its released position about to be clamped to a standard lubricant container.
Figure 4:
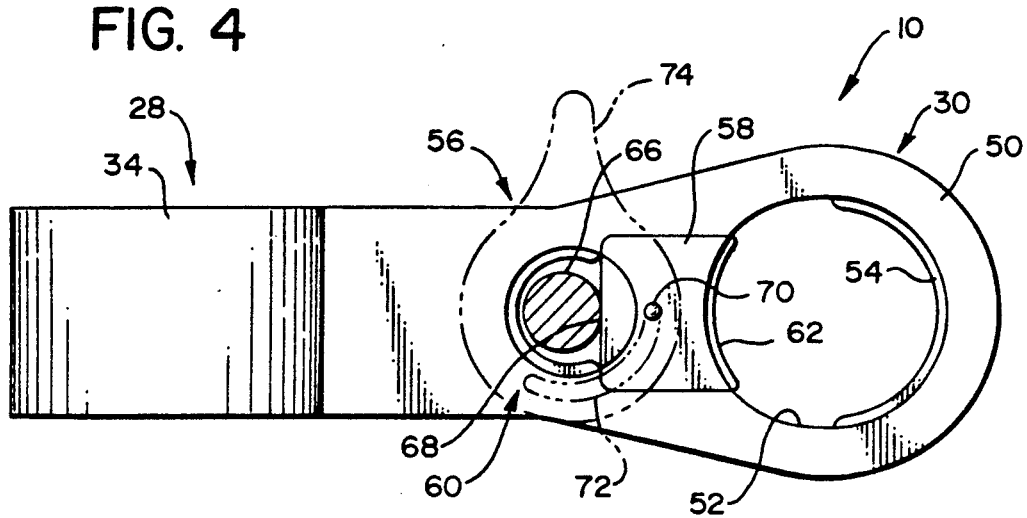
FIG. 4 is a bottom plan view of the apparatus, illustrating the clamping member in its released position about to be clamped to the container.

In the position of FIGS. 2 and 4, the cam member 60 is in its release or nonclamping position, where the clamping member 58 is spaced forwardly a short distance so that the spacing between the lip 62 of the clamping member 58 and the lip 54 at the opening 52 are spaced a greater distance from one another than the diameter of the closure member 24.

Figure 3:
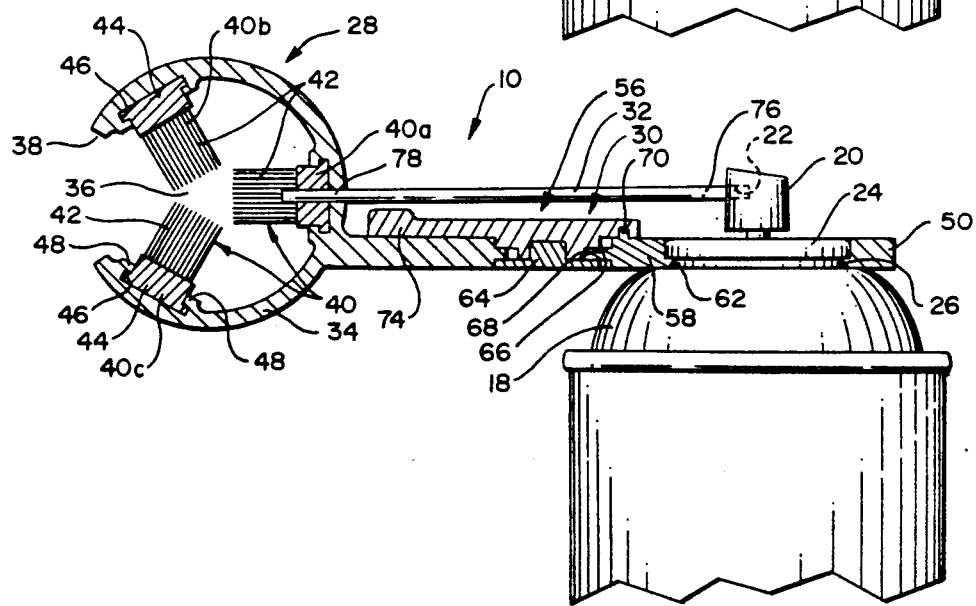
FIG. 3 is a view similar to FIG. 2, but showing the dispensing apparatus mounted in its clamped position on the lubricant container.
Figure 5:
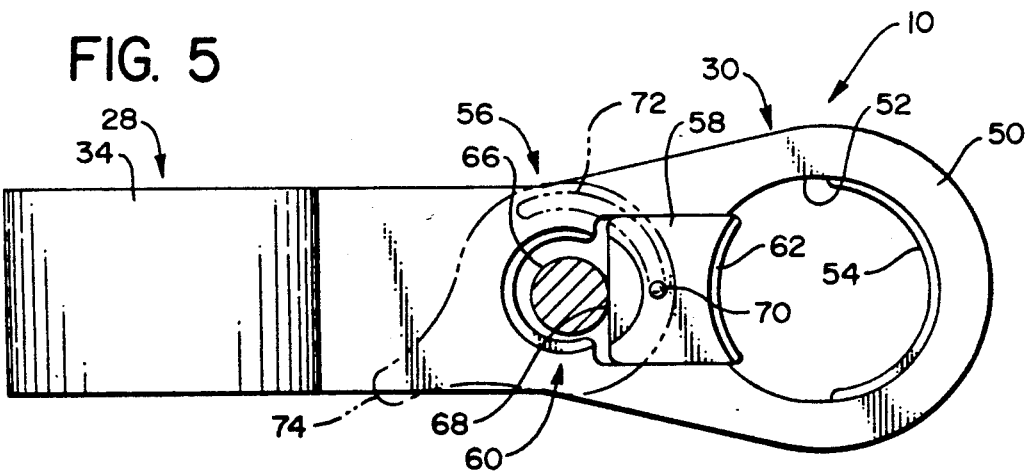
FIG. 5 is a view similar to FIG. 4, but showing the dispensing member in its clamping position.

In FIGS. 3 and 5, the cam member 60 has been rotated to the clamping position so that the cam surface 66 and the cam finger 70, cooperating with the cam groove 72, has the clamping member 58 into its clamping position.

The dispensing tube 32 is a moderately bendable plastic tube sized so that one end 76 of the tube 32 fits in the discharge opening 20 of the dispensing head 22. The other end 78 of the tube 32 fits through a pair of matched openings formed in the rear portion of the housing 34 and in the base portion 44 of the rear-most brush 40.

To describe the operation of the present invention, the device 10 can quickly and conveniently be mounted to the container 14, by initially positioning the loop member 50 just above the closure member 24 on top of the container 14, inserting the rear end 76 of the dispensing tube 32 into the opening 22 of the dispensing head 20, then further lowering the mounting portion 30 so that the loop member 50 and the clamping member 58 are aligned with the groove 26, as illustrated in FIGS. 2 and 4. Then the handle 74 of the cam member 60 is rotated to the position of FIGS. 3 and 5, so as to push the clamping member 58 rearwardly to cause the lip 54 and the lip 62 of the clamping member 5( to fit securely in the groove 26, thus securing the device 10 to the container 14.

It will be noted that the lubricating device 10 extends laterally from the top of the container 14 in a horizontal direction, so that the lubricating area 36 defined by the housing 34 is at approximately the same location as that at which the oil would be protected from the dispensing head 20 if the device 10 were not present.

With the lubricating device securely mounted to the top of the container 14, the person manipulates the container 14 in a conventional manner by grasping the body portion 16 in the person's hand. The container 14 is moved so that the housing 34 passed over the chain 12, which passes through the access slot 38. In FIG. 1, the device 10 is shown positioned so that it is generally horizontally disposed relatively to the chain 12. However, it should be noted that by placing the lengthwise cylindrical axis of the container 14 horizontally, the device 10 can conveniently be positioned so that it extends vertically upwardly from, or downwardly from, the chain 12.

With the container 14 and the device 10 positioned so that the lubricating area of the housing 34 coincides with the location of the chain 12 (as illustrated in FIG. 1), the user depresses the head 20, and the pressurized lubricant or oil in the container 14 passes through the tube 32 and into the rear-most brush 40a. Then the container 14 and device 10 are moved relative to the chain, either by moving the chain 12 along its lengthwise axis and/or moving the container 14 and device 10 along the length of the chain 12. It has been found that with the arrangement shown and described herein, the chain 12 can be properly and uniformly lubricated in all portions thereof, and there is very little, if any, spilling, dripping, or other unwanted contamination of the lubricant on other objects.

With regard to certain specific features of the device 10, it will be noted that the housing 34 has an axially length (i.e. a length dimension parallel to the center axis defined by the cylindrical configuration of the housing 34) that is sufficiently great so that there is little tendency for the lubricant to drip away from the brushes 40 onto the underlying floor surface. In the present embodiment shown herein, the axial length of the housing 34 is about 1.2 inch.

With regard to the positioning of the brushes 40, as shown herein, these three brushes are positioned in a symmetrical pattern so that they are spaced angularly from one another by an angle of about 120°. Further, the positioning of the brushes 40 is such that the ends of the bristles 42 are closer to one another than the width and height dimensions of the chain 12. Thus, the bristles 42 remain in cleaning contact with the chain 12 when the chain 12 is positioned in the lubricating area 36. Further, as indicated previously, with the device 10 being positioned as shown herein relative to the container 14, the direction in which the lubricant is dispensed through the brush 40a can be from above the chain 12 (by moving the housing 34 downwardly on top of the chain with the container horizontally disposed)

or from below the chain 12 (by moving the housing 34 upwardly into operating engagement with the chain 12, also with the container 14 horizontally disposed). Although the lubricant is not dispensed directly into the other brushes 40b and 40c, it has been found that in actual practice the oil becomes distributed in the chain 12 in a manner that the other two brushes 40b and 40c also help distribute the lubricant properly in a uniform fashion along the chain 12. The bristles 42 are aligned generally perpendicular to the lengthwise axis of the housing 34 so that the brushes 40a–c can be moved in either direction relative to the chain 12. Also, as indicated previously, the brushes 40a–c can be conveniently removed, either for cleaning, or possibly for replacement.

Figure 6:
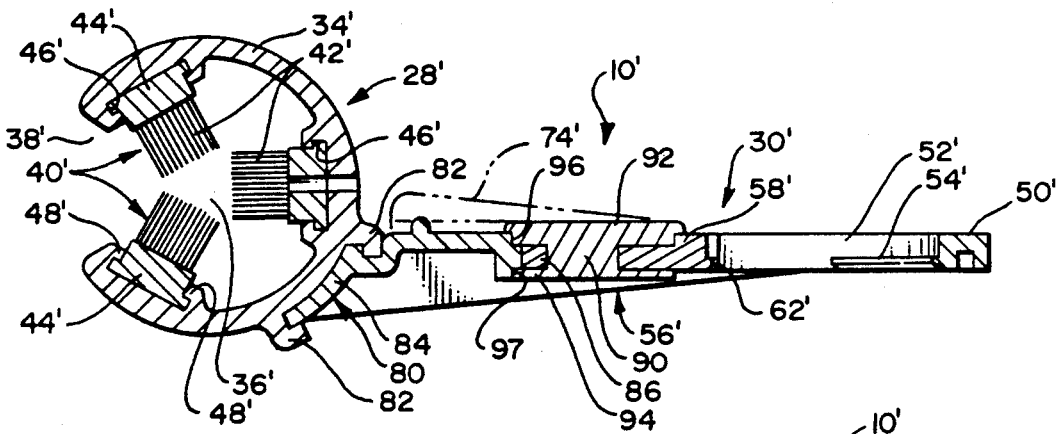
FIG. 6 is a sectional view, similar to that of FIG. 2, illustrating a second embodiment of the present invention.
Figure 7:
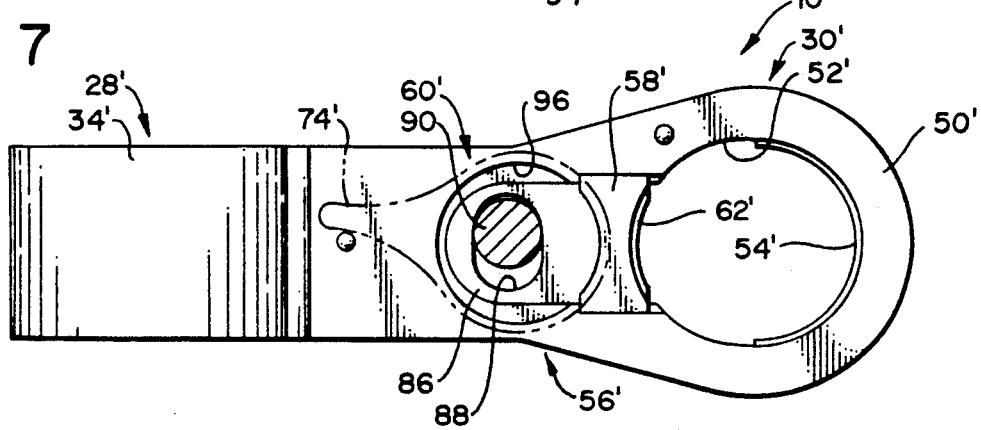
FIGS. 7 and 8 are bottom plan views, similar to FIGS. 4 and 5, but showing the second embodiment of FIG. 6 in the released position of FIG. 7 and the locking position of FIG. 8.
Figure 8:
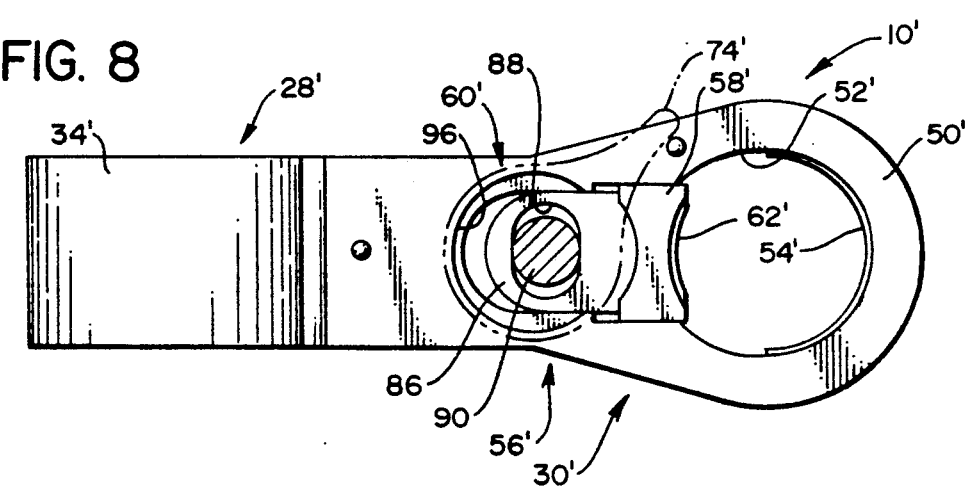

A second embodiment of the present invention will now be described with reference to FIGS. 6 through 8. Components of the second embodiment which are similar to components of the first embodiment will be given like numerical designations with a prime (') designating those of the second embodiment.

The device 10' comprises a lubricating portion 28' and a mounting portion 30'. The lubricating portion 28' comprises a circumferential housing 34' having a plurality of brushes 40'. The lubricating portion 28' of this second embodiment is substantially the same as the lubricating portion 28 of the first embodiment, except that the circumferential housing 34' is removably mounted to the mounting portion 30' by means of a tongue and groove connection, generally designated 80. More specifically, the housing 34' has a pair of parallel inturned lips 82 which engage the edge portions of a mounting plate 84 attached to the mounting portion 30'. The housing 34' can thus be slid out of mounting engagement with the plate 84, and another housing 34' of greater or lesser size, or possibly of a modified configuration, can be attached to the mounting portion 30'.

With regard to the mounting portion 30', there is a circular loop member 50' defining a circular member 52'. The releasable clamping member 56' comprises a clamping member 58' and a cam member 60'. The configuration of the clamping member 58' is such that it has a forwardly extending loop portion 86 defining a moderately oblong opening 88 which receives a circular cam 90 that is formed integrally with upper and lower mounting plates 92 and 94. The upper mounting plate 92 is positioned in a circular recess 96 at the upper surface of the mounting portion 30', and the lower plate 94 is positioned in a recess 97 at the lower surface of the mounting portion 30'. There is an operating handle 74' which functions in substantially the same manner as the handle 74 of the first embodiment.

The operation of the clamping mechanism 56' is substantially the same as in the first embodiment, except that the camming member 90 positively engages the clamping member 58' on both forward and rearward movement of the clamping member 58'. It can readily be seen by reference to FIGS. 7 and 8 that as the member 90–94 is rotated, the clamping portion 90 engages either a forward or rearward surface of the oblong opening 88.

The overall operation of the second embodiment is generally the same as in the first embodiment, so a detailed description thereof will not be included herein.

It is to be understood that various modifications could be made to the device 10 without departing from the scope and spirit of the present invention. Further, while the arrangement of the brushes 40a–c as presently shown and described herein has been found to work quite satisfactorily, it is to be understood that this arrangement, relative to the number and positioning of the brushes 40a–c, could be modified to some extent and still achieve satisfactory results.

I claim:

1. A method for using a handheld lubricant dispensing container to apply lubricant to a drive chain having at least one horizontally extending portion, such as a drive chain for a bicycle or a motorcycle, said container having a dispensing head at one end of said container, with said dispensing head having a discharge opening to discharge lubricant from said head in a predetermined direction, said method comprising:

mounting an applicator to said housing, said applicator having:
   a. a peripheral housing defining an opening, linearly extending lubricating area to receive a said horizontally extending portion of said drive chain, with the housing extending around at least a substantial portion of said lubricating area and having an access opening to receive said drive chain, said housing having a lengthwise axis and comprising a sidewall extending along said lengthwise axis and also extending around said lengthwise axis
   b. brush means mounted within said housing and extending inwardly to said lubricating area; and
   c. discharge tube means for conveying lubricant from said discharge opening in said dispensing tube to said lubricating area in said housing;

receiving a said horizontally extending portion of said drive chain in said lubricating area of said housing so that said lengthwise axis of said housing extends in a horizontal direction;

positioning a portion of said sidewall of said housing beneath said horizontally extending portion of said drive chain which is received in said lubricating area so as to prevent lubricant which is applied to said chain from dripping from said lubricating area; and discharging lubricant from said dispensing head of said container through said discharge tube means to said lubricating area of said applicator mounted to said container so that lubricant is in contact with said brush means so as to be applied to said portion of said drive chain which is received in said lubricating area.

2. The method of claim 1, further comprising the step of:

moving said horizontally extending portion of said drive chain in said lubricating area relative to said applicator so as to uniformly apply lubricant to said drive chain.

3. The method of claim 2, wherein the step of moving said horizontally extending portion of said chain relative to said applicator further comprises:

moving said horizontally extending portion of said drive chain along a lengthwise axis of said chain; and holding said applicator and said container by hand in a stationary position relative to said moving chain.

4. An apparatus adapted to be used in conjunction with a hand held lubricant dispensing container having a dispensing head at one end of the container, with the dispensing head having a discharge opening positioned to discharge lubricant from the head in a predetermined direction, said apparatus being particularly adapted to apply the lubricant to a drive chain having at least one horizontally extending portion, such as a drive chain for a bicycle or motorcycle, said apparatus comprising:

a. a peripheral housing defining an open, linearly extending lubricating area to receive the drive chain, with the housing extending around at least a substantial portion of the lubricating area and having an access opening to receive said drive chain, said housing having a lengthwise axis which extends in a horizontal direction when a said horizontally extending portion of said chain is received in said lubricating area, said housing comprising a sidewall extending along said lengthwise axis and also extending around said lengthwise axis so that a portion of said sidewall is positionable beneath a said horizontally extending portion of said chain which is received in said lubricating area and is configured to prevent lubricant which is applied to said chain from dripping from said lubricating area;

b. brush means mounted within said housing and extending from said housing radially inwardly to said lubricating area, said brush means being positioned in said sidewall of said housing so as to be located substantially entirely within said sidewall;

c. a mounting member connected to said housing and having an attaching portion adapted to be connected to said container so as to mount the apparatus to the container; and d. a discharge tube means having an inlet end adapted to be connected to the discharge opening of the dispensing head, and an outlet end connected to the housing and positioned to discharge lubricant into the lubricating area;

whereby lubricant discharged into said lubricating area so as to be in contact with said brush means is contained substantially entirely within said lubricating area, and said lubricant is prevented from dripping from said lubricating area as said lubricant is applied to said horizontally extending portion of said chain.

5. The apparatus as recited in claim 4, wherein the mounting member and the housing are arranged so that with the apparatus mounted to the container, the lubricating area defined by the housing is positioned generally in alignment with said predetermined direction in which said discharge opening in said dispensing head is positioned to discharge the lubricant from the container.

6. The apparatus as recited in claim 5, wherein the container to which the apparatus is adapted to be connected is a pressurized container, having a body portion adapted to be grasped by a person's hand, and also having a lengthwise axis, and with the dispensing head being mounted at one end of the container relative to the lengthwise axis, said dispensing head being movable to cause discharge of the lubricant from the container, said apparatus being positioned so that the housing defining the lubricating area is positioned generally laterally of the dispensing head.

7. The apparatus as recited in claim 6, wherein said container has a closure member at an end thereof adjacent said dispensing head, and said mounting member comprises loop means engaging said closure member in clamping relationship.

8. The apparatus as recited in claim 7, wherein there is further provided a clamping member movable toward and away from said loop means so as to be able to releasably clamp said loop means to the closure member of the container.

9. The apparatus as recited in claim 8, further comprising cam means mounted to said mounting member and operable to be moved in camming engagement with the clamping member so as to move the clamping member into its clamping position and to a release position.

10. The apparatus as recited in claim 9, wherein said housing is positioned at a forward end of said apparatus, and said mounting member is positioned at a rear portion of said apparatus, said housing portion comprising a generally cylindrical member substantially enclosing said lubricating area, said mounting member being a generally planar member extending rearwardly from said housing, said loop means being positioned at a rear end of said mounting member, said clamping member positioned diametrically opposite to and forwardly of said loop means, said cam member being arranged to move said clamping member rearwardly into clamping position and forwardly away from said loop member into its release position.

11. A combined apparatus for lubricating and cleaning a drive chain having at least one horizontally extending portion, such as a drive chain for a bicycle or a motorcycle, said combined apparatus comprising:

a. a hand held lubricant dispensing container having a dispensing head at one end of the container, with the dispensing head having a discharge opening positioned to discharge lubricant from the head in a predetermined direction;

b. a dispensing device mounted to said container, said dispensing device comprising:

1. a peripheral housing defining an open, linearly extending lubricating area to receive the drive chain, with the housing extending around at least a substantial portion of the lubricating area and having an access opening to receive said drive chain, said housing having a lengthwise axis which extends in a horizontal direction when a said horizontally extending portion of said chain is received in said lubricating area, said housing comprising a sidewall extending along said lengthwise axis and also extending around said lengthwise axis so that a portion of said sidewall is positionable beneath a said horizontally extending portion of said chain which is received in said lubricating area and is configured to prevent lubricant which is applied to said chain from dripping from said lubricating area;

2. brush means mounted within said housing and extending from said housing radially inwardly to said lubricating area, said brush means being positioned in said sidewall of said housing so as to be located substantially entirely within said sidewall;

3. a mounting member connected to said housing and having an attaching portion adapted to be connected to said container so as to mount the apparatus to the container; and 4. a discharge tube means having an inlet end adapted to be connected to the discharge opening of the dispensing head, and an outlet end connected to the housing and positioned to discharge lubricant into the lubricating area;

whereby lubricant discharged into said lubricating area so as to be in contact with said brush means is contained substantially entirely within said lubricating area, and said lubricant is prevented from dripping from said lubricating area as said lubricant is applied to said horizontally extending portion of said chain.

12. The apparatus as recited in claim 11, wherein the mounting member and the housing are arranged so that with the dispensing device mounted to the container, the lubricating area defined by the housing is positioned generally in alignment with said predetermined direction in which said discharge opening in said dispensing head is positioned to discharge the lubricant from the container.

13. The apparatus as recited in claim 12, wherein the device is a pressurized container, having a body portion adapted to be grasped by a person's hand, and also having a lengthwise axis, and with the dispensing head being mounted at one end of the container relative to the lengthwise axis, said dispensing head being movable to cause discharge of the lubricant from the container, said apparatus being positioned so that the housing defining the lubricating area is positioned generally laterally of the dispensing head.

14. The apparatus as recited in claim 13, wherein said container has a closure member at an end thereof adjacent said dispensing head, and said mounting member comprises loop means engaging said closure member in clamping relationship.

15. The apparatus as recited in claim 14, wherein there is further provided a clamping member movable toward and away from said loop means so as to be able to releasably clamp said loop means to the closure member of the container.

16. The apparatus as recited in claim 15, further comprising cam means mounted to said mounting member and operable to be moved in camming engagement with the clamping member so as to move the clamping member into its clamping position and to a release position.

17. The apparatus as recited in claim 16, wherein said housing is positioned at a forward end of said device, and said mounting member is positioned at a rear portion of said device, said housing portion comprising a generally cylindrical member substantially enclosing said lubricating area, said mounting member being a generally planar member extending rearwardly from said housing, said loop means being positioned at a rear end of said mounting member, said clamping member positioned diametrically opposite to and forwardly of said loop means, said cam member being arranged to move said clamping member rearwardly into clamping position and forwardly away from said loop member into its release position.

18. The apparatus as recited in claim 11, wherein the outlet end of the discharge tube extends through the housing to discharge lubricant into the lubricating area.

19. The apparatus as recited in claim 18, wherein said outlet end of the discharge tube is positioned within bristles of the brush means, whereby the lubricant is discharged into the bristles to then be applied to the drive chain which is being lubricated.

20. The apparatus as recited in claim 19, wherein said brush means has brush portions positioned in said housing at angularly spaced locations encompassing a peripheral area greater than 180° around said lubricating area.

21. The apparatus as recited in claim 20, wherein said brush means comprises at least three brush members spaced angularly from one another, with said three brush members being spaced from one another at an angular distance of about one-third of a circle.

* * * * *